United States Patent Office

3,052,736
Patented Sept. 4, 1962

---

3,052,736
**PROCESS FOR THE PRODUCTION OF CYCLODO-
DECATRI-(1,5,9)-ENES AND OTHER CYCLIC
HYDROCARBONS**
Gunther Wilke, Mulheim (Ruhr), Germany, assignor to
Studiengesellschaft Kohle m.b.H., Mulheim (Ruhr),
Germany, a body corporate of Germany
No Drawing. Filed July 27, 1959, Ser. No. 829,533
Claims priority, application Germany Aug. 6, 1958
9 Claims. (Cl. 260—666)

This invention relates to a process for the production of cyclododecatri-1,5,9-enes and other cyclic hydrocarbons having at least 8 carbon atoms and at least 2 double bonds in the ring, for example cyclooctadi-1,5-ene and cyclohexadecatetra-1,5,9,13-ene.

Belgian patent specification No. 555,180 discloses a process for the production of cyclododecatri-1,5,9-enes and other cyclic hydrocarbons having at least 8 carbon atoms and at least two double bonds in the ring, by the action of titanium halides and alkyl aluminium halides on isoprene, piperylene or, most advantageously, butadiene at temperatures up to 150° C., preferably in the presence of solvents, such as aliphatic or aromatic hydrocarbons or halogenated hydrocarbons. With this process, it is advantageous to use catalysts in which the molar ratio of titanium to aluminium is between 1:2.3 and 1:4.7.

Belgian patent specification No. 564,175 discloses a process for the production of cyclododecatri-1,5,9-enes and other cyclic hydrocarbons having at least 8 carbon atoms and 2 double bonds in the ring by the reaction of butadiene, isoprene or piperylene in the presence of catalysts consisting of chromium halides and aluminium hydrocarbons, preferably in the presence of solvents such as aliphatic, aromatic or halogenated hydrocarbons.

It has also already been proposed to subject isoprene, piperylene or, preferably, butadiene to the action of catalysts which consist of mixtures of titanium halides, more especially titanium tetrachloride, with aluminium trialkyls or dialkyl aluminium hydrides, in which catalysts the molar ratio of titanium to aluminium is between 1:0.5 and 1:2.0, and more especially 1:1. This process gives the same end products as in the processes disclosed in the aforementioned Belgian patent specifications.

It has now been found that cyclododecatri-1,5,9-ene of the general formula $C_{12}X_{18}$, in which X represents hydrogen or a methyl radical, as well as other cyclic hydrocarbons, are also obtained by reaction of butadiene, isoprene or piperylene in the presence of catalysts which consist of titanium halides or chromium halides and aluminium hydride or complex metal hydrides. Examples of suitable catalyst components for the reduction of the heavy metal compounds, such as for example titanium tetrachloride or chromyl chloride, are lithium aluminium hydride or calcium aluminium hydride. It is particularly advantageous to use the aluminium hydride which can be prepared as described in German patent specification No. 1,024,062 from aluminium halides and dialkyl aluminium hydrides and which are obtained in an extremely fine highly reactive form after the extraction with an inert hydrocarbon of the dialkyl aluminium halide formed in accordance with the equation $$3AlR_2H + 2AlRCl_2 \rightarrow AlH_3 + 4AlR_2Cl$$

However, the process can be developed in a substantially simple way if the desired aluminium hydride is developed directly in the reaction mixture by combining a fine suspension of a hydride of a metal of the first or second main group with a suspension of aluminium chloride. For example, it is formed according to the following equation:

$$3CaH_2 + 2AlCl_3 \rightarrow 2AlH_3 + 3CaCl_2$$

It is also possible for, for example, sodium hydride, lithium hydride or lithium aluminium hydride to be reacted in a similar manner with aluminium chloride to form aluminium hydride. The aluminium hydride prepared in this way is present in a very finely divided form which is free from ether and which thus constitutes an exceptionally effective reducing agent for the heavy metal salts mentioned above. On combining the aluminium hydride suspensions with, for example, titanium tetrachloride or chromyl chloride, highly active mixed catalyst systems are formed which are able to convert butadiene or isoprene and piperylene at high speed and with yields up to 95% into the cyclic trimeric hydrocarbons.

The particular advantage of the present invention over prior proposals resides in the fact that it is no longer necessary to produce the organic aluminium compounds which are comparatively difficult to handle, and that it is instead possible to use the readily obtainable technical hydrides of aluminium or of the metals of the first and second main groups of the Periodic System, in admixture with aluminium chloride. Particularly good results were for example obtained with calcium hydride. The calcium hydride can be prepared by a new process of Farbenfabriken Bayer A.G., by hydrogenation from calcium carbide. The hydrides suitable as catalyst components according to the invention are not spontaneously inflammable in air, this being in contrast to organic aluminium compounds. For the production of the catalyst, a finely ground suspension of a hydride of a metal of the first or second main group is preferably stirred with a suspension of aluminium chloride in a molar ratio $MeH:AlCl_3$ of from 3:1 to 10:1, the aluminium hydride then being formed. The heavy metal halide, more especially titanium tetrachloride or chromyl chloride, is then added to such suspension. The gaseous diolefine can be introduced into the dark brown catalyst suspension which is formed.

When using the process according to the invention, it is possible to work in the presence of solvents, which are advantageously aliphatic or aromatic hydrocarbons or halogenated hydrocarbons, for example benzene, toluene, chlorobenzene, dichlorobenzene or hexane.

The reaction proceeds at temperatures between —20° and +150° C. with good yields, but it is advantageous to work at temperatures between 30° and 60° C.

Normal pressure is generally employed, but it is also possible to work at sub-atmospheric pressure or at super-atmospheric pressure. The cyclising reaction can be carried out intermittently or continuously.

The isomeric reaction products which are frequently formed, for example the trans,trans,trans- and the trans,trans,cis-cyclododecatri-1,5,9-ene can be separated by known methods, such as for example fractional distillation or crystallisation.

The cyclic compounds which are obtained constitute valuable starting materials for organic syntheses. It has for example already been proposed to transform cyclododecatri-1,5,9-ene into the 13-membered lactam of ω-aminododecanic acid. The monoepoxide of cyclododecatriene can also be transformed by hydrogenation into cyclododecanol, which changes by oxidation, for example with nitric acid, into the dodecane-1,12-diacid. Both the lactam and the dicarboxylic acid are valuable starting materials for plastics, for example polyamides and polyesters.

The following examples further illustrate the invention:

Example 1

80 mmol of aluminium hydride, in the form of a fine suspension obtained in accordance with German patent specification No. 1,024,062 are added under nitrogen to 300 cc. of absolute benzene. 20 mmol of chromyl chloride are slowly added dropwise to this suspension while stirring vigorously. A dark brown to black catalyst suspension is then formed. The mixture is heated to 40° C. Pure butadiene is now introduced and the mixture is kept at a temperature of 40° C. by cooling. In the course of 5 hours, 210 g. of butadiene are taken up. The reaction is then stopped and the catalyst is destroyed with small quantities of methanol. Acetone is added to the solution until continued addition no longer causes any precipitation of polybutadiene. The polybutadiene is filtered off and dried in vacuo at 100° C. 8.5 g. of polybutadiene are obtained, i.e. 4% of the reacted butadiene. The solution is worked up by distillation to obtain 2 g.=1% of dimers, consisting of cyclooctadi-1,5-ene and vinyl cyclohexene, 105 g.=50% cyclododecatri-1,5,9-enes, $B.P._{10}=$ 95–100° C. (70% trans,trans,trans-, 30% trans,trans,cis-cyclododecatriene) and 94.5 g.=45% of higher boiling residue.

Example 2

The procedure followed is that indicated in Example 1, but 20 mmol of the previously described aluminium hydride are reacted with 20 mmol of titanium tetrachloride. The catalyst suspension is heated to 40° C. While stirring vigorously, butadiene is introduced and the temperature is kept at 40° C. by strong cooling. Within 90 minutes, 406 g. of butadiene are taken up. The substance is worked up as described in Example 1 to obtain 4 g. of dimers, 382 g. of trans,trans,cis-cyclododecatri-1,5,9-ene= 94% of the reacted butadiene, 16 g. of higher boiling fractions and 6 g. of polybutadiene.

Example 3

The procedure followed is that indicated in Examples 1 and 2, but the catalyst is developed by reacting a fine suspension of 80 mmol of lithium aluminium hydride with 20 mmol of titanium tetrachloride. The catalyst is formed, slowly, and consequently the mixture is preferably heated to 40–50° C. and stirred for about 3 hours. Butadiene is introduced and 126 g. thereof are absorbed in the course of 6 hours. On working up, there are obtained 2 g. of dimers, 62 g. of cyclododecatri-1,5,9-ene (40% trans,trans,trans-, 60% trans,trans,cis-cyclododecatriene)=49.5% of the reacted butadiene, 27 g. of higher boiling fractions and 35 g. of polybutadiene.

Example 4

30 mmol of lithium aluminium hydride and 10 mmol of aluminium chloride, both in the form of fine suspensions, are mixed under nitrogen in 300 cc. of absolute benzene. This mixture is vigorously stirred for 40 hours and then 20 mmol of titanium tetrachloride are added. Stirring is continued for 6 hours, during which time the dark brown catalyst is developed, and then butadiene is introduced. Within 2 hours, 98 g. are absorbed. On working up, there are obtained 1 g. of dimers, 60 g. of cycloldodecatriene=61% of the reacted butadiene, 11 g. of higher boiling fractions and 26 g. of polybutadiene.

Example 5

In a manner analogous to that of Example 4, 120 mmol of sodium hydride are reacted with 40 mmol of aluminium chloride in 300 cc. of absolute benzene. 20 mmol of titanium tetrachloride are then added to the suspension. At 40° C., butadiene is introduced, and 87 g. thereof are absorbed in the course of 3 hours. There are obtained 7% of dimers, 38% of cyclododecatriene, 26% of higher boiling fractions and 29% of polybutadiene.

Example 6

160 mmol of calcium hydride and 40 mmol of aluminium chloride in the form of fine suspensions are vigorously stirred for 3 hours in 300 cc. of benzene and thereafter 20 mmol of titanium tetrachloride are added. A dark brown catalyst suspension is thereby formed. Butadiene is introduced at 40° C. while cooling strongly and stirring. Within 40 minutes, 273 g. of butadiene are reacted. On working up, there are obtained 10 g. of dimers, 216 g. of cyclododecatriene=79%, 13 g. of higher boiling fractions and 34 g. of polybutadiene.

Example 7

The procedure adopted is as indicated in Example 1, but the catalyst is prepared in the following manner: 2.54 g.=20 mmol of ethyl aluminium dichloride are dissolved in 300 cc. of absolute benzene and 2.58 g.=30 mmol of diethyl-aluminium hydride are added. This mixture is stirred for 40 hours and a fine suspension of solid aluminium hydride is formed. 1.9 g.=10 mmol of titanium tetrachloride are added to this suspension, whereby a very dark coloured catalyst suspension is formed. The mixture is stirred for another half an hour, and then pure butadiene is introduced at an average flow velocity of 200–240 litres per hour at 40° C., while stirring vigorously and cooling. Under these conditions, the reaction vessel must be cooled with ice. In the course of 1 hour, 402 g. of butadiene are reacted. On working up the reaction product, there are obtained:

3 g.=0.7% of cyclooctadi-1,5-ene/vinyl cyclohexene
10 g.=2.5% of trans,trans,trans-cyclododecatriene, M.P. +34° C.
356 g.=88.5% of trans,trans,cis-cyclododecatriene, M.P. −18° C., $n_D^{20}=1.5072$
28 g.=7% of higher oligomers
5 g.=1.3% of precipitable polybutadiene.

The total yield of cyclododecatrienes, based on reacted butadiene, is 91%.

Example 8

The procedure is as set out in Example 7, but the catalyst is prepared in the following manner: 10 mmol of a fine aluminium chloride suspension are stirred for 24 hours with 30 mmol of diethylaluminium hydride in 300 cc. of absolute benzene and the mixture is then reacted with 10 mmol of titanium tetrachloride, stirring being continued for another half an hour. Butadiene is then introduced at an average flow velocity of 200–240 litres per hour. Within two hours, 659 g. of butadiene are absorbed. There are obtained:

4 g.=0.6% of cyclooctadiene/vinyl cyclohexene
18 g.=2.7% of trans,trans,trans-cyclododecatriene, M.P. +34° C.
588 g.=89.3% of trans,trans,cis-cyclododecatriene, M.P. −18° C. $n_D^{20}=1.5072$
35 g.=5.3% of higher oligomers
14 g.=2.1% of polybutadiene.

The total yield of cyclododecatrienes, based on reacted butadiene, is 92%.

Example 9

9.1 mmol of a fine aluminium hydride suspension are reacted with 9.1 mmol of titanium tetrachloride in 150 cc. of absolute benzene. A deep dark brown to black catalyst suspension is formed. In the course of two hours, 131 g. of pure isoprene is added dropwise to the mixture, the temperature rising up to 50° C. The mixture is stirred for another 5 hours at 20° C. and is then worked up in the usual manner, to obtain:

1.9 g. (=1.5%) of dimers of isoprene
30.5 g. (=26.5%) of a mixture of isomeric trimethyl cyclododecatrienes, of which the methyl groups are on the carbon atoms of the double bonds. B.P._{12mm} = 135° C., $n_D^{20}$=1.5125

35 g. (=30.3%) of higher oligomers 38 g. (=33%) of polyisoprene.

*Example 10*

The procedure is as set forth in Example 9, but the catalyst is prepared in the following manner: 6 mmol of a fine aluminium chloride suspension are stirred with 18 mmol of a fine lithium aluminium hydride suspension for 3 hours at 55° C. in 150 cc. of absolute benzene. 18 mmol of titanium tetrachloride are then added at 30° C., there initially being formed a brown suspension which becomes black after stirring for another 1½ hours at 50° C. Within 35 minutes, 105 g. of isoprene are added dropwise, the temperature rising from 20° to 50° C. The temperature is kept at 50° C. by cooling. Working up is then carried out in the usual manner after another 30 minutes, to obtain:

4.9 g. (=2.0%) of dimers of isoprene 37.2 g. (=38.5%) of a mixture of isomeric trimethyl cyclododecatrienes, of which the methyl groups are on the carbon atoms of the double bonds. B.P._{12}=135° C., $n_D^{20}$=1.5125

38 g. (=39.4%) of higher oligomers traces of polyisoprene.

*Example 11*

20 mmol of ethyl aluminium dichloride are stirred for 17 hours with 30 mmol of diethyl aluminium hydride in 150 cc. of absolute benzene. 10 mmol of titanium tetrachloride are then added to the fine aluminium hydride suspension which is formed. A blackish-brown catalyst is thus obtained. This is stirred for half an hour and then 110 g. of pure piperylene are added dropwise within 40 minutes. By cooling, the temperature is kept at 50° C. to begin with and then the mixture is heated over a period of 6 hours almost up to the boiling point of the benzene. Working up is carried out in the usual manner and there are obtained 12.2 g. of a mixture of isomeric trimethyl cyclododecatrienes, of which the methyl groups are disposed on the carbon atoms adjacent the double bonds, B.P._{2.5}=92–94° C., $n_D^{20}$=1.4910 to 1.4930.

What I claim is:

1. Process for the production of cyclododecatri-1,5,9-enes which comprises contacting a member selected from the group consisting of butadiene, isoprene and piperylene with a catalyst comprising a metal halide selected from the group consisting of titanium halides and chromium halides and a metal hydride selected from the group consisting of aluminum hydride and complex metal hydride, to thereby produce cyclododecatri-1,5,9-ene with other cyclic hydrocarbons having at least 8 carbon atoms and at least two double bonds in the ring.

2. Process according to claim 1 in which said catalyst is formed from said halide and said aluminum hydride with said aluminum hydride being present in finely divided reactive form in a suspension in an inert hydrocarbon.

3. Process according to claim 1, in which said hydride is formed in situ in the reaction mixture by combining a fine suspension of a hydride of a metal selected from the group consisting of metals of groups I(a) and II(a) of the periodic system with a suspension of aluminum chloride.

4. Process according to claim 1 in which said catalyst is formed by contacting a suspension of a hydride of a metal selected from groups I(a) and II(a) of the periodic system with a suspension of aluminum chloride in a molar ratio of said hydride to said aluminum chloride between 3:1 and 10:1 and thereafter adding said halide.

5. Process according to claim 1 in which said contacting is effected at a temperature between about −20 and +150° C.

6. Process according to claim 5 in which said contacting is effected at a temperature between about 30 and 60° C.

7. Process according to claim 1 in which said contacting is effected in the presence of a solvent.

8. Process according to claim 7 in which said solvent is a member selected from the group consisting of aliphatic, aromatic and halogenated hydrocarbons.

9. Process according to claim 8 in which said solvent is benzene.

References Cited in the file of this patent

UNITED STATES PATENTS

| 2,979,543 | Wilkes et al. | Apr. 11, 1961 |
| 2,979,544 | Wilkes et al. | Apr. 11, 1961 |

FOREIGN PATENTS

| 538,782 | Belgium | Dec. 6, 1955 |
| 555,180 | Belgium | Aug. 20, 1957 |
| 202,993 | Austria | Apr. 25, 1959 |